US008995325B2

(12) United States Patent
Wu et al.

(10) Patent No.: US 8,995,325 B2
(45) Date of Patent: Mar. 31, 2015

(54) MULTICAST GROUP MANAGEMENT METHOD AND WIRELESS NETWORK APPARATUS USING THE SAME

(71) Applicant: Accton Technology Corporation, Hsinchu (TW)

(72) Inventors: Szu-Cheng Wu, Hsinchu (TW); Tan-Chun Lu, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 104 days.

(21) Appl. No.: 13/757,225

(22) Filed: Feb. 1, 2013

(65) Prior Publication Data

US 2013/0201888 A1    Aug. 8, 2013

(30) Foreign Application Priority Data

Feb. 3, 2012    (TW) .............................. 101103529 A

(51) Int. Cl.
H04W 52/02    (2009.01)

(52) U.S. Cl.
CPC ............ *H04W 52/0212* (2013.01); *Y02B 60/50* (2013.01)
USPC ............ 370/311; 370/328; 455/574; 713/320

(58) Field of Classification Search
None
See application file for complete search history.

(56) References Cited

U.S. PATENT DOCUMENTS

| | | | |
|---|---|---|---|
| 8,576,761 B1 * | 11/2013 | Pitchaiah ...................... | 370/311 |
| 2006/0276214 A1 * | 12/2006 | Harris et al. .................. | 455/519 |
| 2009/0287897 A1 * | 11/2009 | Horibe et al. ................. | 711/167 |
| 2010/0091711 A1 * | 4/2010 | Sawai ........................... | 370/328 |
| 2010/0332884 A1 * | 12/2010 | Yoshida et al. ............... | 713/324 |

* cited by examiner

*Primary Examiner* — Chi H Pham
*Assistant Examiner* — Shick Hom
(74) *Attorney, Agent, or Firm* — Muncy, Geissler, Olds & Lowe, P.C.

(57) ABSTRACT

A wireless network apparatus provides a wireless communication service for wireless devices through a first virtual access unit. The wireless network apparatus includes a determining module for outputting a first determination result when a wireless device enables the power saving mode and joins to a multicast group; a virtual access unit creating module for creating a second virtual access unit based on the first determination result outputted by the determining module; and a control module for controlling the second virtual access unit to provide a wireless communication service for the wireless device based on the first determination result outputted by the determining module.

14 Claims, 2 Drawing Sheets

MULTICAST GROUP MANAGEMENT METHOD AND WIRELESS NETWORK APPARATUS USING THE SAME

CROSS-REFERENCE TO RELATED APPLICATION

This application claims the benefit of Taiwan Patent Application No. 101103529, filed on Feb. 3, 2012, which is hereby incorporated by reference for all purposes as if fully set forth herein.

BACKGROUND OF THE INVENTION

1. Field of Invention

The present invention relates to a multicast group management method and a wireless network apparatus using the same, and more particularly, to a management method by using virtual access units for dividing groups.

2. Related Art

Recently, users of wireless networks are increasing day by day, such that the consumption of network bandwidth and the demand for network addresses are increasing as well. To solve the problems, the wireless network service providers and the wireless network equipment manufacturers propose a concept of multicast group through which the consumption of network bandwidth can be reduced.

Internet Group Management Protocol (IGMP) is a protocol for managing the multicast group. A node can send a host membership report message to a router, so as to create or join a multicast group in the router. When the router receives a multicast packet, such as media information, assigned to the multicast group, the multicast packet is transmitted to each node of the multicast group.

In addition, when the nodes of the multicast group, for example wireless devices, enable power saving mode for saving power or other reasons, they are entering a power save mode or standby mode. However, according to the wireless communication protocol in IEEE802.11, if a wireless device is unable to receive the media information transmitted by a router due to enabling of the power saving mode, the media information to be transmitted by the router must be saved, and until the wireless device is awake, the media information then can be transmitted to the wireless device.

Moreover, in the same multicast group, other wireless devices which disable the power saving mode or without the power saving mode have to wait until then before they can receive the media information. Therefore, it may cause a delay of receiving the media information and have an influence of fluency of receiving the media information for those wireless devices.

SUMMARY OF THE INVENTION

To solve the above-mentioned problems, the present invention provides a wireless network apparatus and a management method by using the network device for the multicast group. Therefore, the media information can be transmitted under the architecture of IGMP to avoid the wireless device enabling a power save mode affecting the wireless device without enabling a power save mode, which causes a receiving delay of the media information.

One embodiment of the present invention provides a wireless network apparatus which provides a wireless communication service for a wireless device through a first virtual access unit. The wireless network apparatus comprises a determining module for outputting a first determination result when the wireless device enables the power save mode and joins to a multicast group; a virtual access unit creating module for creating a second virtual access unit according to the first determination result outputted by the determining module; and a control module for controlling the second virtual access unit to provide the wireless communication service for the wireless device based on the first determination result outputted by the determining module.

One embodiment of the present invention provides a multicast group management method applied for a wireless network apparatus which provides a wireless communication service for a wireless device through a first virtual access unit. The steps of the management method comprise: determining whether the wireless device enables a power saving mode and joins to a multicast group by a determination module; creating a second virtual access unit by a virtual access unit creating module when the determining module determines that the wireless device enables a power saving mode and joins to the multicast group; and controlling the second virtual access unit to provide a wireless communication service for the wireless device by a control module.

One embodiment of the present invention provides a multicast group management method applied for a wireless network apparatus which provides a wireless communication service for a wireless device through a first virtual access unit. The steps of the management method comprise: creating a second virtual access unit by a virtual access unit creating module when a determining module determines that the wireless network apparatus enables a power saving mode and joins to a multicast group; controlling the first virtual access unit to stop providing the wireless communication service of the wireless device and controlling a wireless communication service provided by the second virtual access unit for the wireless device by a control module; and controlling the second virtual access unit to stop providing the wireless communication service for the wireless device and controlling the wireless communication service provided by the first virtual access unit by the control module when the determining module determines that the wireless device leaves the multicast group or the wireless device disables the power saving mode.

The technical features of the present invention lie in that: by using the above mentioned device and performing the above mentioned steps, any wireless device joining the multicast group and enabling a power saving mode thereof is wirelessly connected with the second virtual access unit, such that the wireless devices connected with the first virtual access unit will not have a transmission delay, thereby solving the transmission delay problem caused by the members of the multicast group enabling the power save mode thereof.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
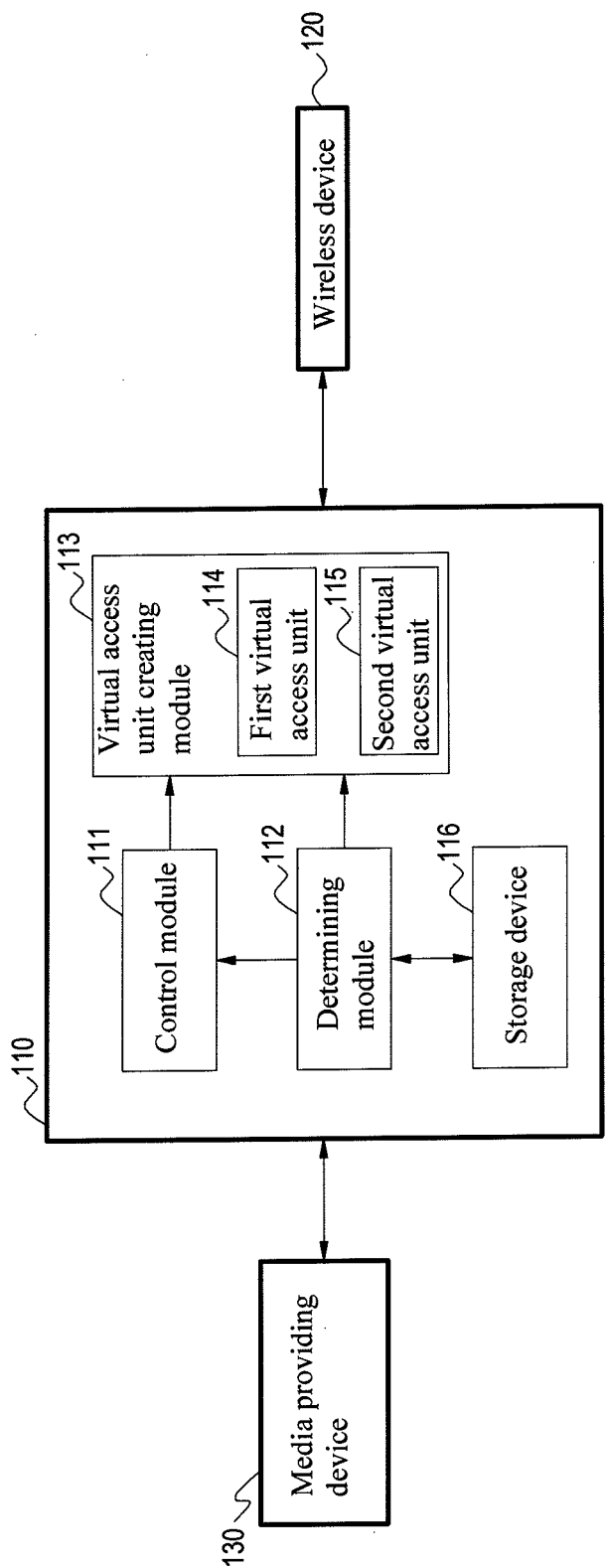
FIG. 1 shows a diagram of a network communication systematic structure according to one embodiment of the present invention.

The present invention will become more fully understood from the detailed description given herein below for illustration only, and thus are not limitative of the present invention, and wherein:

Referring to FIG. 1, it shows a diagram of a network communication systematic structure, which is used to depict how a wireless network apparatus 110 works in a network communication system to manage a multicast group according to one embodiment of the present invention. In one embodiment of the present invention the network communication system comprises a wireless network apparatus 110, a wireless device 120, and a media providing device 130.

The media providing device 130 transmits the packets containing multimedia information to the wireless network apparatus 110 based on the means of multicast, so as to transmit the multimedia information to a member of an assigned multicast group through the wireless network apparatus 110. In one embodiment of the present invention, the media providing device 130 is a media-playing server which can transmit multimedia information to a specific device through various transmission technologies, such as streaming. Here, the multimedia information includes data or information constituting images, voice, and music and so on.

The wireless device 120 receives the multimedia information provided by the media providing device 130 through the wireless network apparatus 110. In addition, the wireless device 120 may join the multicast group by transmitting a join multicast group message packet to the wireless network apparatus 110 and leave the multicast group by transmitting a leave multicast group message, packet to the wireless network apparatus 110. In one embodiment of the present invention, the join multicast group message packet or the leave multicast group message packet is the join message and the leave message of IGMP. Moreover, when enabling a power saving mode, the wireless device 120 transmits a message packet of enabling a power saving mode to the wireless network apparatus 110 to inform that the power saving mode of the wireless device 120 will be enabled. In one embodiment of the present invention, the message packet of enabling a power saving mode may be a power management bit of a frame control field of a frame, but not limited thereto. In one embodiment of the present invention, the wireless device 120 may be a smart phone, a tablet PC, a laptop or other devices capable of wireless communications, or the wireless device 120 may be constituted by related modules, elements and software, but not limited thereto.

The wireless network apparatus 110 is used to provide a wireless communication service for the wireless device 120 through a first virtual access unit 114, such that the wireless network apparatus 110 receives the multimedia information transmitted by the media providing device 130, and then transmits the multimedia information to the wireless device 120. In one embodiment of the present invention, the wireless network apparatus 110 may be a wireless router or a wireless access point. The wireless network apparatus 110 comprises a determining module 112, a control module 111, a virtual access unit creating module 113, and a storage device 116.

The storage device 116 is used to store information of wireless devices. In one embodiment of the present invention, the information of the wireless devices contains the information of each wireless device which is connected with the wireless network apparatus 110, so as to provide the information of whether the wireless device enables or disables its power-saving settings. The information of the wireless devices includes: wireless device identification information (for example, media access control (MAC) addresses, rates, channels, encryptions and enabling/disabling of the power saving mode). In one embodiment of the present invention, the storage device 116 stores a database of enabling power saving mode. The database of enabling power saving mode records the wireless device identification information of every wireless device in which the power saving mode is enabled; therefore, through searching the wireless device identification information in the database of enabling power saving mode, whether a wireless device 120 enables the power saving mode will be acquisitive. In one embodiment of the present invention, the storage device 116 may be a memory, a flash memory, a read-only memory, a non-volatile memory, or an equivalent, but not limited thereto.

The determining module 112 is used for outputting a first determination result when the wireless device 120 enables the power saving mode and joins to a multicast group. In one embodiment of the present invention, when the wireless network apparatus 110 receives the join multicast group message packet transmitted by the wireless device 120, the determining module 112 determines that the wireless device 120 joins the multicast group, and determines whether the wireless device 120 enables the power saving mode based on the wireless device identification information in the storage device 116. If the wireless device identification information records that the wireless device 120 enables the power saving mode, the determining module 112 determines that the wireless device 120 enables the power save mode; If the wireless device identification information records that the wireless device 120 disables the power saving mode or has no power saving mode, the determining module 112 determines that the wireless device 120 disables the power saving mode. When determining that the wireless device 120 joins the multicast group and enables the power saving mode, the determining module 112 outputs a first determination result; when the determining module 112 determines that the wireless device 120 leaves the multicast group or has no power saving mode, the determining module 112 outputs a second determination result. Here, the first determination result is a first voltage level signal, such as a high voltage level signal, but not limited thereto. On the other hand, the second determination result is a second voltage level signal, such as a low voltage level signal, but not limited thereto.

It is noted when the wireless network apparatus 110 receives the message packet of enabling power saving mode or the message packet of disabling power saving mode transmitted from the wireless device 120, the wireless network apparatus 110 will perform recordings to record that the wireless device 120 enables or disables the power saving mode. In one embodiment of the present invention, the recordings are performed in following conditions: when the wireless network apparatus 110 receives the message packet of enabling power saving mode from the wireless device 120, the determining module 112 records that the wireless device 120 enables the power saving mode in the storage device 116; or when the wireless network apparatus 110 receives the message packet of disabling power saving mode from the wireless device 120, the determining module 112 records that the wireless device 120 disables the power saving mode in the storage device 116. In one embodiment of the present invention, the recordings are performed in following conditions:

when the wireless network apparatus 110 receives the message packet of enabling power saving mode from the wireless device 120, the determining module 112 adds the wireless device identification information of the wireless device 120 into the database of enabling power saving mode of the storage device 116; and when the wireless network apparatus 110 receives the message packet of disabling power saving mode from the wireless device 120, the determining module 112 deletes the corresponding identification information of the wireless devices 120 from the database of enabling power saving mode of the storage device 116. If the database of enabling power saving mode of the storage device 116 doesn't exist corresponding identification information of the wireless devices 120, no action is taken.

A virtual access unit creating module 113 is used to create a second virtual access unit 115 based on the first determination result outputted by the determining module 112. In the embodiment of the present invention, the virtual access unit creating module 113 creates a second virtual access unit 115 based on the first determination result outputted by the determining module 112. Here, the second virtual access unit 115 is used as a reality access point, and has a different BSSID from the first virtual access unit 114.

A control module 111 is used to control a wireless communication service provided by the second virtual access unit 115 for the wireless device 120 based on the first determination result outputted by the determining module 112. In addition, the control module 111 controls a wireless communication service provided by the first virtual access unit 114 for the wireless device 120 based on the second determination result outputted by the determining module 112. In the embodiment of the present invention, the control module 111 transmits a deassociation request to the wireless device 120 based on the protocol of IEEE 802.11 after the control module 111 received the first determination result and the virtual access unit creating module 113 created the first virtual access unit 114, so as to stop the wireless communication service by the first virtual access unit 114 to the wireless device 120. Upon a reconnect, when receiving the resassociation request transmitted by the wireless device 120 again, the control module 111 transmits a reassociation response. Then, the second virtual access unit 115 accepts the resassociation request to connect with the wireless device 120, so as to provide a wireless communication service for the wireless device 120. Similarly, based on the second determination result outputted by the determining module 112, the control module 111 transmits a deassociation request to the wireless device 120 to stop the wireless communication service provided by the second virtual access unit 115 to the wireless device 120. Upon a reconnect, when receiving the resassociation request transmitted by the wireless device 120 again, the control module 111 transmits a reassociation response. Then, the first virtual access unit 114 accepts the resassociation request of the wireless device 120 to connect for the wireless device 120, so as to complete the wireless communication service between the first virtual access unit 114 and the wireless device 120. In one embodiment of the present invention, the control module 111, the determining module 112, the virtual access unit creating module 113 may be at least two selected from a group consisting of a chip set, processors such as CPU, MPU, control circuits, auxiliary circuits, operation software, firmware, or related modules, elements, software, but not limited thereto.

Figure 2:
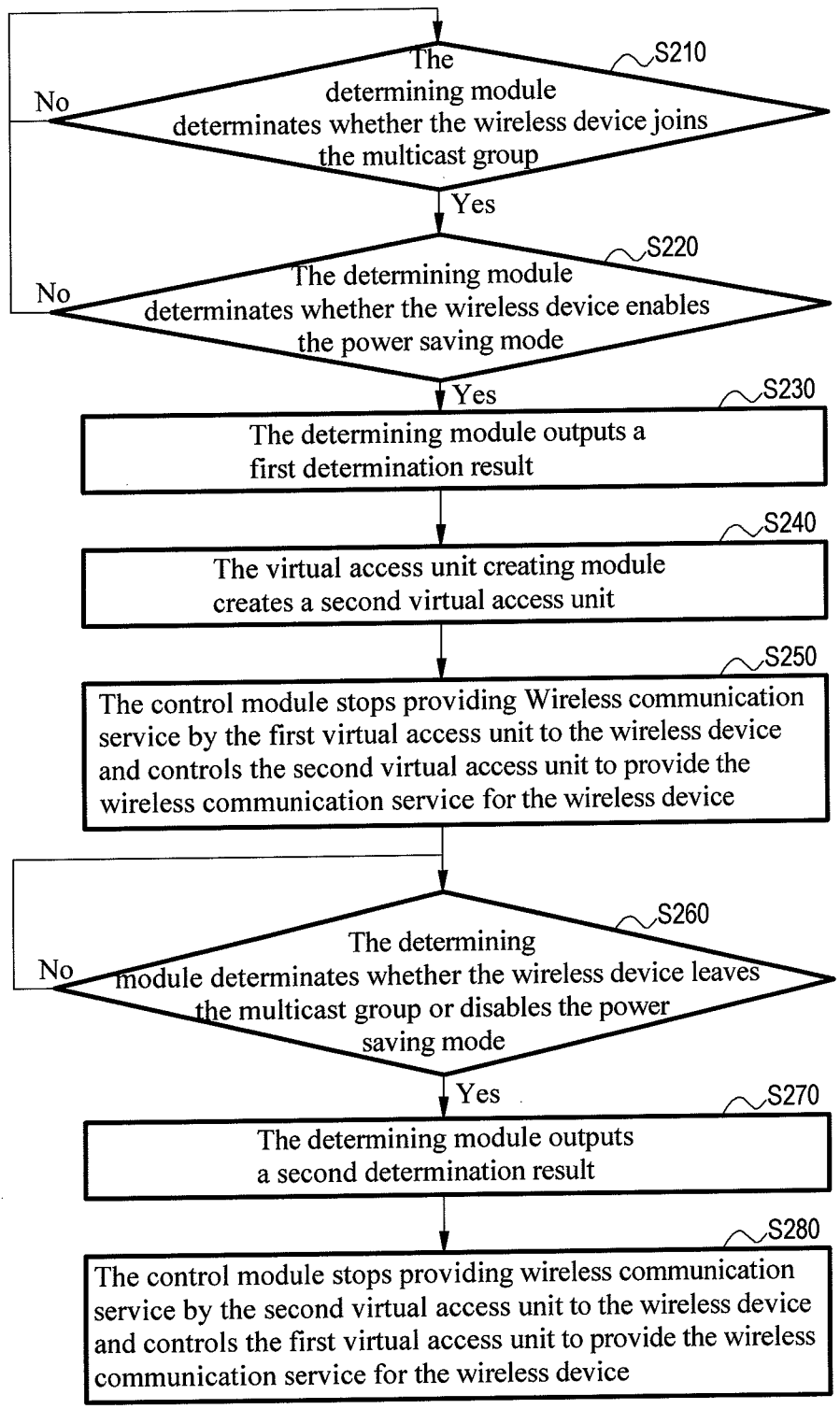
FIG. 2 shows a flow chart of multicast group management method for wireless devices according to one embodiment of the present invention.

Please refer to FIG. 2, it shows a flow chart of multicast group management method for wireless devices according to one embodiment of the present invention. Please refer to FIG. 1 again for explaining how the wireless network apparatus 110 performs the steps of the multicast group management method. It is noted that the first virtual access unit 114 is a default device for communicating for the wireless device 120 in the embodiments of the present invention.

In the step S210, the determining module 112 determinates whether the wireless device 120 joins the multicast group. If yes, go to step S220; if not, keep repeating the step. In this step, the determining module 120 determinates whether the wireless device 120 transmits the join multicast group message packet. When the determining module 120 determines that the join multicast group message packet is received, then determines the wireless device 120 joins the multicast group.

In the step S220, the determining module 112 determines whether the wireless device 120 enables the power saving mode. If yes, go to step S230; otherwise go back to step S210.

In this step, the determining module 112 determines whether the wireless device 120 enables the power saving mode based on the searched wireless device identification information. In one embodiment of the present invention, the determining module 112 searches the wireless device identification information. If the wireless device identification information corresponding to the wireless device 120 shows a status of enabled, the determining module 120 determines that the wireless device 120 enables the power saving mode. In one embodiment of the present invention, the determining module 112 searches the database of enabling power saving mode in the storage device 116. If the wireless device identification information of the wireless devices 120 is matched in the database of enabling power saving mode, the determining module 112 determines that the wireless device 120 enables the power saving mode; if the wireless device identification information of the wireless devices 120 doesn't exist in the database of enabling power saving mode, the determining module 112 determinates that the wireless device 120 disables the power saving mode.

In the step S230, the determining module 112 outputs a first determination result. In this step, the first determination result outputted by the determining module 112 indicates the wireless device 120 joins the multicast group and also enables the power saving mode.

In one embodiment of the present invention, the determining module 112 outputs a first voltage level signal.

In the step S240, the virtual access unit creating module 113 creates a second virtual access unit 115. In this step, the virtual access unit creating module 113 creates the second virtual access unit 115 based on the first determination result.

In step S250, the control module 111 stops the wireless communication service provided by the first virtual access unit 114 to the wireless device 120 and controls the second virtual access unit 115 to provided the wireless communication service to the wireless device 120. In this step, the control module 111 controls the first virtual access unit 114 to transmit the deassociation request to the wireless device 120 so as to stop providing the wireless communication service by the first virtual access unit 114 to the wireless device 120. In addition, upon receiving the reassociation request transmitted by the wireless device 120, the control module 111 controls the second virtual access unit 115 to transmit a reassociation message to the wireless device 120, so as to control the second virtual access unit 115 to provide the wireless communication service to the wireless device 120.

In step S260, the determining module 112 determines whether the wireless device 120 leaves the multicast group or disables the power saving mode. If yes, go to the step S270; if not, keep repeating the step. In this step, the determining module 112 determines that the wireless device 120 leaves the multicast group based on the leave multicast group message packet transmitted by the wireless device 120, and the determining module 112 determines that the wireless device 120 disables the power saving mode based on the packet of disabling power saving mode received.

In one embodiment of the present invention, the determining module 112 determines that the wireless device 112 disables the power saving mode based on the searched wireless device identification information. In one embodiment, the determining module 112 determines that the wireless device 120 disables the power save mode based on being unable to search corresponding wireless device identification information of the wireless devices 120 in the database of enabling power saving mode.

In the step S270, the determining module 112 outputs a second determination result.

In the step 5280, the control module 111 stop providing the wireless communication service by the second virtual access unit 115 to the wireless device 120 and controls the first virtual access unit 114 to provide the wireless communication service to the wireless device 120. In this step, after receiving the second determination result, the control module 111 controls the second virtual access unit 115 to transmit a deassociation request to the wireless device 120, so as to stop providing the wireless communication service by the second virtual access unit 115 to the wireless device 120. In addition, upon receiving the reassociation request transmitted by the wireless device 120, the control module 111 controls the first virtual access unit 114 to transmit a reassociation message, so as to control the first virtual access unit 114 to provide the wireless communication service to the wireless device 120.

Through performing above-mentioned steps, the wireless device enabling the power saving mode and joining the multicast group is changed to connect with the second virtual access unit instead of the first virtual access unit in original. Therefore, all of the wireless devices which may cause a delay are changed to have a wireless communication service with the second virtual access unit, such that the first virtual access unit will not have a transmission delay, thereby solving the transmission delay problem caused by the member of the multicast group enabling the power save mode.

Although the present invention is disclosed through the above embodiments, the embodiments are not intended to limit the present invention. Equivalent replacements like variations and modifications made by any person skilled in the similar art without departing from the spirit and scope of the present invention shall still fall within the protection scope of the present invention.

What is claimed is:

1. A wireless network apparatus providing a wireless communication service for a wireless device through a first virtual access unit, wherein the wireless network apparatus comprising:
    a determining module used for outputting a first determination result when the wireless device enabling a power saving mode joins to a multicast group;
    a virtual access unit creating module used for creating a second virtual access unit based on the first determination result outputted by the determining module;
    a control module used for controlling the second virtual access unit to provide the wireless communication service for the wireless device based on the first determination result outputted by the determining module; and
    a storage device used for storing a wireless device identification information,
    wherein the determining module determines that the wireless device is enabling the power saving mode based on the wireless device identification information.

2. The wireless network apparatus as claimed in claim 1, wherein the control module further used for controlling the first virtual access unit to stop providing the wireless communication service for the wireless device based on the first determination result outputted by the determining module.

3. The wireless network apparatus as claimed in claim 1, wherein the storage device further
    used for storing a database including the list of apparatuses enabling power saving mode;
    the determining module determines the wireless device enables the power saving mode based on the database.

4. The wireless network apparatus as claimed in claim 1, further comprising:
    the determining module outputs a second determination result when the wireless device disables the power saving mode or leaves the multicast group; and
    the control module controls the wireless communication service provided by the first virtual access unit to the wireless device based on the second determination result outputted by the determining module.

5. The wireless network apparatus as claimed in claim 4, wherein the control module further comprising: stopping the wireless communication service provided by the second virtual access unit to the wireless device based on the second determination result outputted by the determining module.

6. A multicast group management method, applied to a wireless network apparatus providing a wireless communication service for a wireless device through a first virtual access unit, the method comprising steps of:
    determining whether the wireless device enabled power saving mode joins to a multicast group by a determination module,
    wherein determining that the wireless device enables the power saving mode based on a wireless device information corresponding to a wireless device identification information of the wireless device showing a status of enabled by the determining module;
    creating a second virtual access unit by a virtual access unit creating module when the determining module determines that the wireless device enabled power saving mode joins to the multicast group; and
    controlling the second virtual access unit to provide the wireless communication service for the wireless device by a control module.

7. The multicast group management method as claimed in claim 6, wherein before the step of controlling the second virtual access unit to provide the wireless communication service for the wireless device by the control module, further comprising a step of:
    controlling the first virtual access unit to stop providing the wireless communication service for the wireless device by the control module.

8. The multicast group management method as claimed in claim 7, wherein the step of controlling the first virtual access unit to stop providing the wireless communication service for the wireless device by the control module is performed through transmitting a deassociation request to the wireless device by the control module.

9. The multicast group management method as claimed in claim 6, further comprising a step of following:
    when the determining module determines that the wireless device leaves the multicast group or the wireless device disables the power saving mode, the control module controls the wireless communication service provided by the first virtual access unit for the wireless device.

10. The multicast group management method as claimed in claim 9, wherein when the determining module determines that the wireless device leaves the multicast group or the wireless device disables the power saving mode, further comprising a step of following:
    controlling the second virtual access unit to stop providing the wireless communication service for the wireless device.

11. The multicast group management method as claimed in claim 6, wherein the step of determining whether the wireless device enables power saving mode further comprising a step of following:
  determining that the wireless device enables the power save mode based on if the wireless device identification information of the wireless device is matched in a database of enabling power saving mode by the determining module.

12. A multicast group management method, applied to a wireless network apparatus proving a wireless communication service for a wireless device through a first virtual access unit, the method comprising steps of:
  determining that the wireless device enables a power saving mode and joins to a multicast group by a determining module, and creating a second virtual access unit by a virtual access unit creating module,
  wherein determining the wireless device enables the power saving mode by the determining module based on a wireless device identification information recording that the wireless device enables the power saving mode;
  controlling the first virtual access unit to stop providing the wireless communication service for the wireless device and controlling the second virtual access unit to provide the wireless communication service for the wireless device by a control module; and
  controlling the second virtual access unit to stop providing the wireless communication service for the wireless device and controlling the first virtual access unit to provide the wireless communication service for the wireless device by the control module, when the determining module determines that the wireless device leaves the multicast group or the wireless device disables the power saving mode.

13. The multicast group management method as claimed in claim 12, wherein the determining module determines that the wireless device enables the power save mode based on if the wireless device identification information of the wireless device is matched in a database of enabling power saving mode.

14. The multicast group management method as claimed in claim 12, wherein the control module controls the first virtual access unit to stop providing the wireless communication service for the wireless device and controls the second virtual access unit to provide the wireless communication service for the wireless device, further comprising steps of:
  controlling the first virtual access unit to transmit a deassociation request by the control module, so as to control the first virtual access unit to stop providing the wireless communication service for the wireless device; and
  when receiving the reassociation request transmitted by the wireless device, the control module controls the second virtual access unit to transmit a reassociation response to the wireless device, so as to control the wireless communication service provided by the second virtual access unit for the wireless device.

* * * * *